United States Patent
Hwang et al.

(10) Patent No.: US 8,505,043 B2
(45) Date of Patent: Aug. 6, 2013

(54) METHOD AND APPARATUS FOR PROVIDING METADATA OF CONTENT, AND METHOD AND APPARATUS FOR LIMITING CONTENT USAGE AUTHORITY

(75) Inventors: In-chul Hwang, Suwon-si (KR); O-Hoon Kwon, Suwon-si (KR); Sung-jin Park, Suwon-si (KR); Mun-jo Kim, Suwon-si (KR); Eun-hee Rhim, Yongin-si (KR); Sung-wook Ahn, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 547 days.

(21) Appl. No.: 12/358,897

(22) Filed: Jan. 23, 2009

(65) Prior Publication Data

US 2009/0193483 A1    Jul. 30, 2009

Related U.S. Application Data

(60) Provisional application No. 61/023,601, filed on Jan. 25, 2008, provisional application No. 61/026,326, filed on Feb. 5, 2008.

(30) Foreign Application Priority Data

May 13, 2008  (KR) .......................... 10-2008-0044013

(51) Int. Cl.
  *H04N 7/16* (2011.01)
(52) U.S. Cl.
  USPC ............... 725/25; 725/29; 725/110; 725/120; 725/133; 725/136; 725/142

(58) Field of Classification Search
  USPC .............. 725/25, 29, 110, 120, 133, 136, 142
  See application file for complete search history.

(56) References Cited

U.S. PATENT DOCUMENTS

| | | | |
|---|---|---|---|
| 2004/0103428 A1 | 5/2004 | Seok et al. | |
| 2004/0143679 A1* | 7/2004 | Ogikubo | 709/247 |
| 2006/0085816 A1 | 4/2006 | Funk et al. | |
| 2006/0117342 A1 | 6/2006 | Park et al. | |
| 2006/0259927 A1 | 11/2006 | Acharya et al. | |
| 2006/0291412 A1 | 12/2006 | Naqvi et al. | |
| 2007/0064637 A1 | 3/2007 | Lee et al. | |
| 2007/0079380 A1* | 4/2007 | Kawaguchi et al. | 726/26 |

(Continued)

FOREIGN PATENT DOCUMENTS

| | | |
|---|---|---|
| CN | 1620129 A | 5/2005 |
| CN | 1685323 A | 10/2005 |

(Continued)

OTHER PUBLICATIONS

Mexican Office Action, dated Aug. 26, 2011, issued in Application No. MX/a/2010/005624.

(Continued)

*Primary Examiner* — Mulugeta Mengesha
(74) *Attorney, Agent, or Firm* — Sughrue Mion, PLLC

(57) ABSTRACT

Provided are a method and apparatus for limiting a content usage authority scope of a client by using metadata in an Internet Protocol Television (IPTV) service. The method performed by a metadata server adds control information to the metadata and transmits the metadata, wherein the content usage authority scope of the client is defined in the control information. The client of a user limits a content control operation according to a user input by using the control information extracted from the metadata.

17 Claims, 6 Drawing Sheets

U.S. PATENT DOCUMENTS

| | | | |
|---|---|---|---|
| 2007/0143444 A1 | 6/2007 | Kamiya et al. | |
| 2007/0162931 A1 | 7/2007 | Mickle et al. | |
| 2007/0206773 A1 | 9/2007 | Branam | |
| 2007/0240200 A1 | 10/2007 | Han | |
| 2008/0141285 A1 | 6/2008 | Lee et al. | |
| 2008/0155585 A1* | 6/2008 | Craner et al. | 725/32 |
| 2008/0212937 A1 | 9/2008 | Son | |
| 2009/0100147 A1 | 4/2009 | Igarashi | |
| 2009/0183211 A1 | 7/2009 | Yan et al. | |

FOREIGN PATENT DOCUMENTS

| | | | |
|---|---|---|---|
| CN | 1798112 A | | 7/2006 |
| CN | 1839631 A | | 9/2006 |
| CN | 1852411 A | | 10/2006 |
| CN | 101060532 A | | 10/2007 |
| CN | 101155191 A | | 4/2008 |
| EP | 1 235 431 A1 | | 8/2002 |
| EP | 1 667 454 A1 | | 6/2006 |
| EP | 1679896 A1 | * | 12/2006 |
| JP | 2002-366835 A | | 12/2002 |
| JP | 2007-272868 A | | 10/2007 |
| KR | 10-2001-0025456 A | | 4/2001 |
| KR | 10-2006-0120650 A | | 11/2006 |
| KR | 10-2007-0032103 A | | 3/2007 |
| KR | 1020070061228 A | | 6/2007 |
| KR | 1020070061555 A | | 6/2007 |
| KR | 10-2007-0100069 A | | 10/2007 |
| KR | 1020070119351 A | | 12/2007 |
| KR | 10-2008-0010862 A | | 1/2008 |
| WO | 2007/102547 A1 | | 9/2007 |
| WO | 2007/102550 A1 | | 9/2007 |

OTHER PUBLICATIONS

Communication from the European Patent Office dated Sep. 29, 2011, in counterpart European Application No. 09704867.2.

Communication dated Mar. 20, 2012 from the State Intellectual Property Office of P.R. China in counterpart Chinese application No. 200980103120.1.

Communication dated Jan. 20, 2012 from the Mexican Institute of Industrial Property in counterpart Mexican application No. MX/a/2010/005624.

Communication, dated Jun. 8, 2012, issued by the State Intellectual Property Office of P.R. China in counterpart Chinese Application No. 200980111266.0.

Communication, dated Jul. 3, 2012, issued by the State Intellectual Property Office of P.R. China in counterpart Chinese Application No. 200980109747.8.

Communication, dated Aug. 3, 2012, issued by the Indonesian Patent Office in counterpart Indonesian Applicatio No. W-00201003224.

Communication, dated Jun. 27, 2012, issued by the State Intellectual Property Office of P.R. China in counterpart Chinese Application No. 200980104286.5.

Digital Video Broadcasting (DVB) Transport of MPEG-2 Transport Stream (TS) Based DVB Services over IP Based Networks Document DVB A086 Rev.5, Jul. 2007, 126 pages.

Open IPTV Forum Standard Function Architecture V1.0 Working Draft, Members of the Open IPTV Forum, Sep. 20, 2007, pp. 1-14.

Communication dated Nov. 5, 2012 issued by the State Intellectual Property Office of the People's Republic of China in counterpart Chinese Application No. 200880117209.9.

Communication dated Feb. 28, 2013 issued by the State Intellectual Property Office of P.R. China in counterpart Chinese Patent Application No. 200980110455.6.

Communication dated Jan. 5, 2013 issued by the State Intellectual Property Office of P.R. China in counterpart Chinese Patent Application No. 200980126539.9.

* cited by examiner

METHOD AND APPARATUS FOR PROVIDING METADATA OF CONTENT, AND METHOD AND APPARATUS FOR LIMITING CONTENT USAGE AUTHORITY

CROSS-REFERENCE TO RELATED PATENT APPLICATIONS

This application claims the benefit of U.S. provisional Patent Application No. 61/023,601, filed on Jan. 25, 2008, and U.S. Provisional Patent Application No. 61/026,326, filed on Feb. 5, 2008, in the U.S. Patent and Trademark Office, and priority from Korean Patent Application No. 10-2008-0044013, filed on May 13, 2008, in the Korean Intellectual Property Office, the disclosures of which are incorporated herein by reference in their entirety.

BACKGROUND OF THE INVENTION

1. Field of the Invention

Apparatuses and methods consistent with the present invention relate to an Internet Protocol Television (IPTV), and more particularly, to limiting a content usage scope of a client by using metadata.

2. Description of the Related Art

Internet Protocol Televisions (IPTVs) indicate a communication and broadcasting convergence service which provides multimedia contents such as TV programs, video content, audio content, text content, and data services via an IP network such as a high-speed internet network of which the security and reliability are secured.

Additional information about multimedia contents, which are provided by various service providers, is provided via metadata. In general, metadata is defined as "data about data". A standardizing work on a metadata format applicable for IPTVs is being conducted by the TV-Anytime forum (TVAF) which uses a multimedia description scheme that is defined by the Moving Picture Experts Group-7 (MPEG-7). The TVAF is an association of international broadcasting stations and international research institutes, and according to the TVAF, metadata can include not only basic content information, such as a broadcasting time, a title, a brief synopsis, main characters, and the like, which is included in an electronic program guide (EPG) of a related art digital broadcasting service, but also can include semantic content information such as content generation information, a content specification, a scene description, summary information, and the like.

Metadata used in IPTVs enables a user to scan and manage contents from various sources such as a broadcasting, a bi-directional TV, the Internet, and a local database. Metadata includes a user profile including search preferences that enables the user to conveniently perform automatic contents filtering and to obtain contents, components necessary for convenient searching for user desired contents, and information about content copyright, formats, use periods, and the like.

IPTVs provide functions such as Audio on Demand (AOD), Video on Demand (VOD), Content on Demand (COD), etc. A service provider transmits metadata in which information by which multimedia content is described, and a client scans multimedia contents by using the received metadata to access desired multimedia content. A content creator or the service provider pre-analyzes the information by which the multimedia content is to be provided, performs indexing to generate metadata, and provides the generated metadata to the client. In this manner, a user can scan a location of desired content by using metadata provided by an IPTV service provider server, can download the desired content from the scanned location, and can use the desired content.

Meanwhile, a content creator or a service provider may want to limit a usage authority of content downloaded by a user. For example, the content creator or the service provider may want to prevent the user from skipping advertisements which cover the cost for using free content, or may allow only a streaming reproduction of content and prevent the user from storing the content. However, related art IPTV technology has no means to satisfy such requirements of the content creator or the service provider.

SUMMARY OF THE INVENTION

The present invention provides a method of limiting a usage authority so that a user can use content only within a usage scope allowed by a service provider, and a method of providing metadata for the method of limiting the usage authority.

The present invention also provides a server apparatus for generating and transmitting metadata which includes control information for limiting a content usage authority, and a client apparatus for receiving the metadata and limiting a content usage.

According to an aspect of the present invention, there is provided a method of providing metadata of content via a predetermined network, the method including the operations of generating metadata comprising control information for limiting a content usage authority scope of a client which receives the content, and transmitting the metadata to the client.

The predetermined network may be an Internet protocol (IP) network, and the content may be provided to the client according to an Internet protocol television (IPTV) service.

The control information may include information about whether the client is able to perform at least an operation from among a reproduction start, a reproduction stop, a reproduction pause, a reproduction resumption, fast forwarding, rewinding, a skip, and a recording, which are related to the content.

The metadata may be based on an Extensible Markup Language (XML) format defined in the specifications of the TV-Anytime forum (TVAF).

The control information may be set in such a manner that the content usage authority scope is limited in a unit of the entire content or a specific portion of the content.

According to another aspect of the present invention, there is provided a method of limiting a content usage authority scope of a client using content that is provided via a predetermined network, the method including receiving metadata from a metadata server, wherein the metadata comprises control information in which the content usage authority scope of the client is defined, extracting the control information from the metadata, setting the content usage authority scope of the client according to the extracted control information, and limiting an operation of the client using the content according to the content usage authority scope.

The operation of limiting the operation may include the operations of receiving a control command about the content; determining whether an operation about the content based on the control command is allowed to the client, according to the content usage authority scope; and performing the operation about the content according to the control command if the operation about the content is allowed to the client, and not performing the operation about the content if the operation about the content is not allowed to the client.

According to another aspect of the present invention, there is provided a server which provides a client with information about content provided via a predetermined network, the server includes a metadata generation unit which generates metadata comprising control information for limiting a content usage authority scope of the client which receives the content, and a metadata providing unit which transmits the metadata to the client.

According to another aspect of the present invention, there is provided a client which receives content provided via a predetermined network, the client including a metadata scan unit which receives metadata from a metadata server, wherein the metadata comprises control information in which a content usage authority scope is defined, an authority setting unit which extracts the control information from the metadata, and sets the content usage authority scope of the client according to the extracted control information; an input unit receiving a control command from a user, wherein the control command is about the content, and a control unit which limits a processing operation about the content based on the control command, according to the content usage authority scope.

BRIEF DESCRIPTION OF THE DRAWINGS

The above and/or other aspects of the present invention will become more apparent by describing certain exemplary embodiments of the present invention with reference to the accompanying drawings in which.

DETAILED DESCRIPTION OF THE INVENTION

Figure 1:
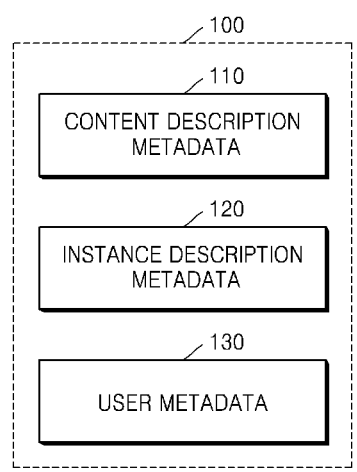
FIG. 1 is a block diagram of a configuration of metadata according to an exemplary embodiment of the present invention.

Certain exemplary embodiments of the present invention will now be described in greater detail with reference to the accompanying drawings. In the following description, same drawing reference numerals are used for the same elements even in different drawings.

The present invention inserts control information, which is for limiting a content usage authority of a client, into metadata used in an Internet Protocol Television (IPTV) service, and limits a content control operation of the client by using the control information. By doing so, the present invention prevents a wrongful content usage by the client disregarding limitations of a content creator or a service provider, and makes the client use content according to the limitations of the content creator or service provider.

First, a configuration of the metadata including the control information will now be described.

FIG. 1 is a block diagram of a configuration of metadata 100 according to an exemplary embodiment of the present invention. Referring to FIG. 1, the metadata 100 includes a content description metadata 110, an instance description metadata 120, and a user metadata 130. Metadata about content is interconnected with a content identifier called a content reference identifier (CRID).

The content description metadata 110 is generated by a content creator, and includes information such as a program title, a genre, a synopsis, critic reviews, etc. The instance description metadata 120 is generated by a service provider, and includes a content location (a broadcasting time, a channel, a Uniform Resource Locator (URL), etc.), a usage rule, a delivery parameter, etc. The user metadata 130 relates to user information based on a user's previous content usage, such as a user preference, a usage history, and a personal bookmark, and is generated by a user. In particular, the content description metadata 110 or the instance description metadata 120 of the metadata 100 includes predetermined control information in which a content usage authority scope of the user is defined. For example, as shown in Table 1 below, the content description metadata 110 or the instance description metadata 120 of the metadata 100 may include 8 bits of control information that define the content usage authority scope of the user.

TABLE 1

| Value of 8 bits control information | Usage authority of corresponding client |
| --- | --- |
| 0x01 (00000001) | Media Start/Stop |
| 0x02 (00000010) | Media Pause/Resume |
| 0x04 (00000100) | Media FF/REW/SKIP (Trick mode) |
| 0x08 (00001000) | Media Record |

Referring to Table 1, in the case where a service provider of an IPTV allows a client to start or stop content, the service provider adds control information with a 0x01 (00000001 in binary) value to the metadata 100. In the case where the service provider allows the client to pause and resume the content, the service provider adds control information with a 0x02 value to the metadata 100. Also, in the case where the service provider allows the client to perform a trick mode about the content, that is, fast forwarding FF, rewinding REW, and a skip, the service provider adds control information with a 0x04 value to the metadata 100. In the case where the service provider allows the client to store the content, the service provider adds control information with a 0x08 value to the metadata 100. As well as the values of Table 1, it is possible to set control information with a 0xff value to indicate an allowance for all operations regarding content, control information with a 0xf7 value to indicate an allowance for all operations excluding recording, and control information with a 0xfb value to indicate an allowance for all operations excluding the trick mode. The aforementioned values of control information are examples only, and if required, it would be understood by one of ordinary skill in the art that control information values can be changed by a client to distinguish allowed operations for content from non-allowed operations for the content.

Such control information may be added to the metadata 100 based on an Extensible Markup Language (XML) format that is defined in the specifications of the TV-Anytime forum (TVAF). Also, the control information may be set in such a manner that an authority scope is limited in a unit of entire content or a specific portion of the content. For example, in the case where the service provider attempts to prevent the client from performing the trick mode on a segment with a first identifier (ID), from among a plurality of segments which form content provided via a Video on Demand (VOD) service, the service provider may generate control information based on the XML and add the generated control information to the metadata 100.

```
< SegmentInformation segmentId="vod-service-segmentid-01"
  segmentcontrol="0xfb" >
```

In the above example, SegmentInformation segmentId indicates a segment ID of the content for which a control operation of the client is limited, and "vod-service-segmentid-01" indicates a segment with the segment ID of the content provided via the VOD service, while segmentcontrol is control information that indicates a client's usage authority scope over the segment according to an assigned value. In the above example, "0xfb" means that all operations excluding the trick mode are allowed.

Similarly, the control information for limiting the content usage authority of the client may be set in a unit of a broadcasting program or a Content on Demand (COD) program. The client receives the metadata 100, refers to the control information included in the metadata 100, and sets the content usage authority of the client, thereby allowing a user to control the content only within the set content usage authority.

Figure 2:
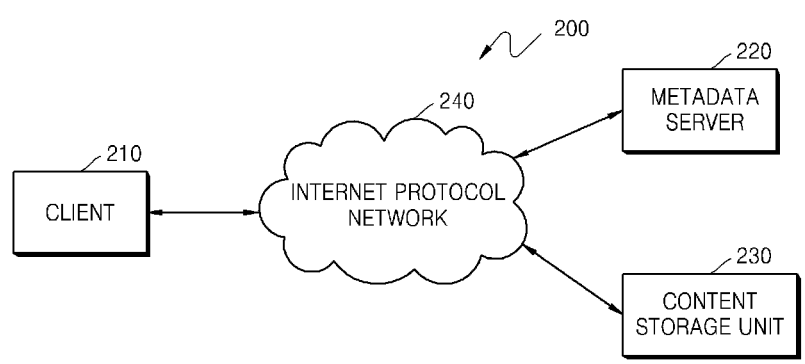
FIG. 2 is a functional block diagram illustrating an Internet Protocol Television (IPTV) network according to another exemplary embodiment of the present invention.

FIG. 2 is a functional block diagram of an IPTV network 200 according to another exemplary embodiment of the present invention.

Referring to FIG. 2, the IPTV network 200 includes a client 210, a metadata server 220, a content storage unit 230, and an Internet Protocol (IP) network 240. In FIG. 2, for convenience of description, the IPTV network includes a client 210, a metadata server 220, and a content storage unit 230. However, it would be understood by one of ordinary skill in the art that a method of providing metadata and limiting a content usage authority according to the present invention is not limited thereto but may be applied to an IPTV network which includes a plurality of clients, metadata servers, and content storage units.

A service provider of an IPTV operates the metadata server 220. The service provider transmits metadata including additional information about content to the client 210 via the metadata server 220.

The client 210 connects with the metadata server 220 via the IP network 240, scans desired content, and receives metadata about the scanned content. In the present invention, the client 210 is a client of an IPTV, and includes various apparatuses such as a set-top box or a personal video recorder (PVR) that can receive the metadata transmitted from the metadata server 220, and parse the received metadata.

The client 210 determines a location of content in the content storage unit 230, by referring to content location information included in the metadata, and requests the content storage unit 230 for transmission of the content. If the client 210 has use authority, the content storage unit 230 transmits the requested content to the client 210. In particular, the client 210 extracts control information, which is for limiting a content usage authority scope and which is additionally included in the received metadata, and limits a content control operation by a user input according to the extracted control information.

The content storage unit 230 represents a server storing contents, a local database, and the like, and may be provided by the service provider that operates the metadata server 220. The content storage unit 230 provides the requested content to the client 210, which has the use authority.

Figure 3:
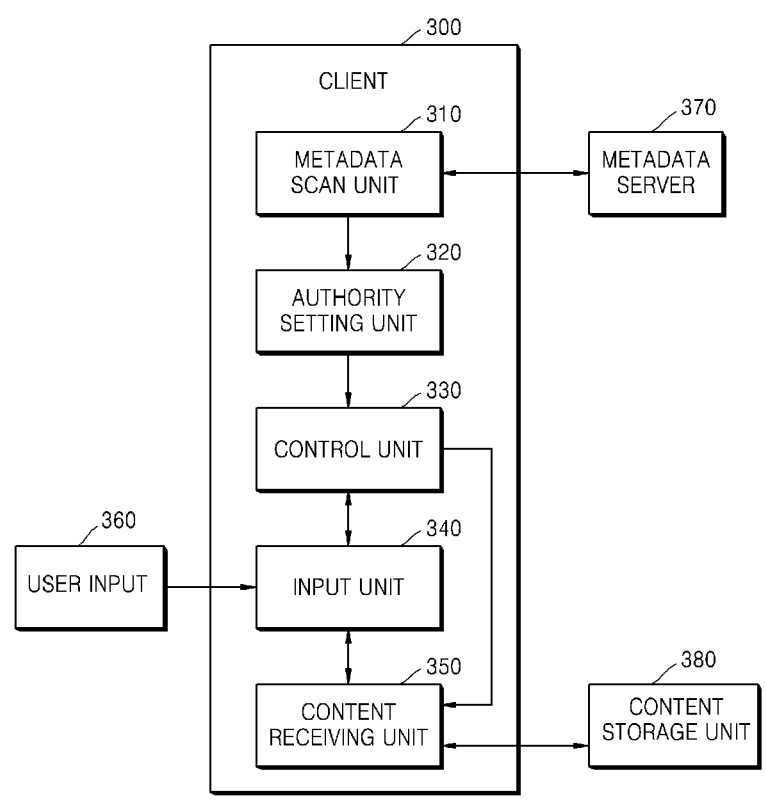
FIG. 3 is a functional block diagram of a configuration of a client in FIG. 2.
Figure 4:
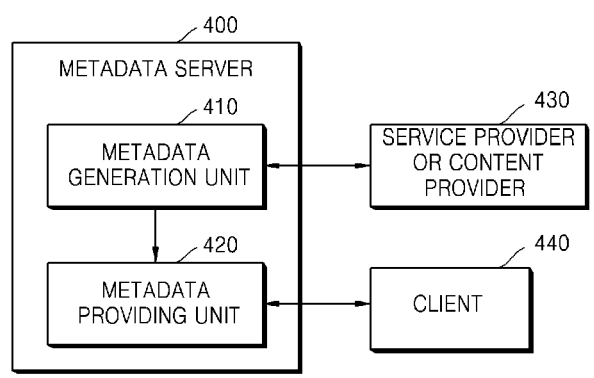
FIG. 4 is a functional block diagram of a configuration of a metadata server in FIG. 2.

FIG. 3 is a block diagram of a configuration of the client 210 in FIG. 2. FIG. 4 is a block diagram of a configuration of the metadata server 220 in FIG. 2.

Referring to FIG. 3, a client 300 includes a metadata scan unit 310, an authority setting unit 320, a control unit 330, an input unit 340, and a content receiving unit 350.

The metadata scan unit 310 connects with a metadata server 370 of a service provider of an IPTV, scans user desired content, and receives metadata about the scanned content. The content receiving unit 350 connects with its corresponding content storage unit 380 and receives the content by using content location information included in the metadata. The authority setting unit 320 extracts control information from the metadata, and in which a content usage authority scope of the client 300 is defined.

The control unit 330 sets the content usage authority scope of the client 300 according to the extracted control information. When the control unit 330 receives a control command about the content from a user input 360 via the input unit 340, the control unit 330 determines whether the control command from the user input 360 is included in the set content usage authority scope. If the control command from the user input 360 is included in the set content usage authority scope, the control unit 330 performs an operation on the content according to the control command. However, if the control command from the user input 360 is not included in the set content usage authority scope, the control unit 330 does not perform the control command but displays a warning message to the user via a display unit (not shown). For example, when the control information about the content usage authority scope of the client 300 is 0xfb, indicating that a content trick mode by the client 300 is limited, and when the user inputs control commands such as fast forwarding, rewinding, and skipping of the content via the input unit 340, the control unit 330 may limit a trick mode operation by the user, and display the warning message, which informs the user that operations for the control commands are not allowed, via the display unit (not shown). In this manner, the service provider providing free content may limit the content trick mode by the client 300 and make the user obligatorily watch advertisements, for example, without skipping the advertisements.

Referring to FIG. 4, a metadata server 400 includes a metadata generation unit 410 and a metadata providing unit 420.

The metadata generation unit 410 pre-analyzes information about content provided by a service provider or a content provider 430, performs indexing to generate metadata, and provides the generated metadata to a client. As described above, in order to set a content operation scope that is allowed to the client, the metadata generation unit 410 adds control information, in which a content usage authority scope of the client is defined, to the metadata.

The metadata providing unit 420 transmits metadata to the client 440 via an IP network, wherein the metadata is about content requested by the client.

Figure 5:
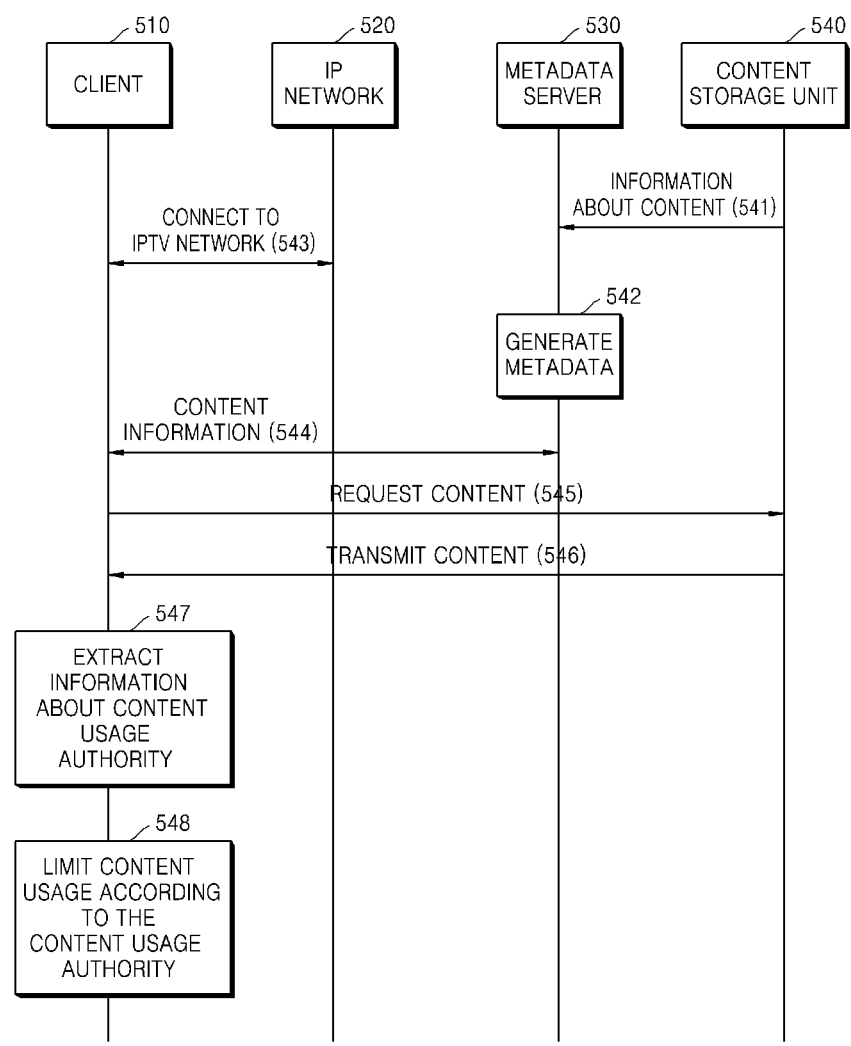
FIG. 5 is a flowchart of a method by which metadata is transmitted from a metadata server via an IP network, and a client sets a content usage authority scope by using the transmitted metadata, according to an exemplary embodiment of the present invention.

FIG. 5 is a flowchart of a method by which metadata is transmitted from a metadata server 530 via an IP network 520, and a client 510 sets a content usage authority scope according to the transmitted metadata, according to an exemplary embodiment of the present invention.

Referring to FIG. 5, in operation 541, a content storage unit 540 transmits information about stored content to the metadata server 530. In operation 542, the metadata server 530 associates the information about the content with control information in which a content usage authority scope of the client 510 is defined, thereby generating metadata.

In operation 543, the client 510 connects to the IP network 520. The client 510 in an IPTV service environment of a managed network may go through a procedure of a network level authentication and a network formation, and connect to the IP network 520 using an IP address provided by a service provider. The client 510 in an open Internet environment may connect to the IP network 520 via an Internet service provided by an Internet service provider (ISP).

In operation 544, the client 510 connects with the metadata server 530 so as to scan content and receive metadata information about the scanned content. In operation 545, the client 510 determines a location of content in the content storage unit 540, by using content location information included in the received metadata information, and requests transmission of the content to the content storage unit 540. In operation 546, the content storage unit 540 transmits the requested content to the client 510 that has use authority.

In operation 547, the client 510 analyzes the control information included in the metadata information, and extracts content usage authority information related to the client 510. In operation 548, the client 510 determines whether a content control operation due to a user input is included in the use authority, by using the extracted content usage authority information, so as to perform the content control operation or to output a warning message to a user without performing the content control operation.

Figure 6:
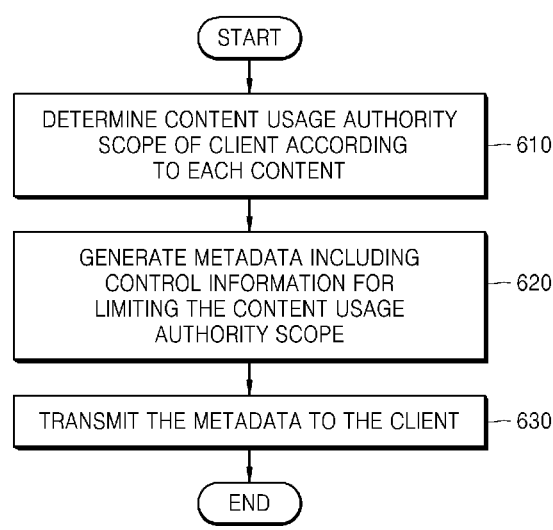
FIG. 6 is a flowchart of a method by which a metadata server provides metadata of content to a client, according to another exemplary embodiment of the present invention.

FIG. 6 is a flowchart of a method by which a metadata server provides metadata of content to a client, according to an exemplary embodiment of the present invention.

Referring to FIG. 6, in operation 610, the metadata server determines a content usage authority scope of the client, according to each content. That is, when metadata is generated, the content usage authority scope that is related to provided content may be determined according to intentions of a content creator or a service provider.

In operation 620, the metadata server generates the metadata including control information for limiting the content usage authority scope. As described above, the control information may be generated based on an XML format defined in the specifications of the TVAF, and then, may be added to the metadata. Also, the metadata may vary according to the types of provided contents. For example, in the case of multimedia content, the control information may include whether the client can perform at least an operation from among a content reproduction, a content stop, a content pause, a content resumption, content fast forwarding, content rewinding, a content skip, and a content recording.

In operation 630, according to a request from the client, the metadata server transmits the metadata including the control information to the client.

Figure 7:
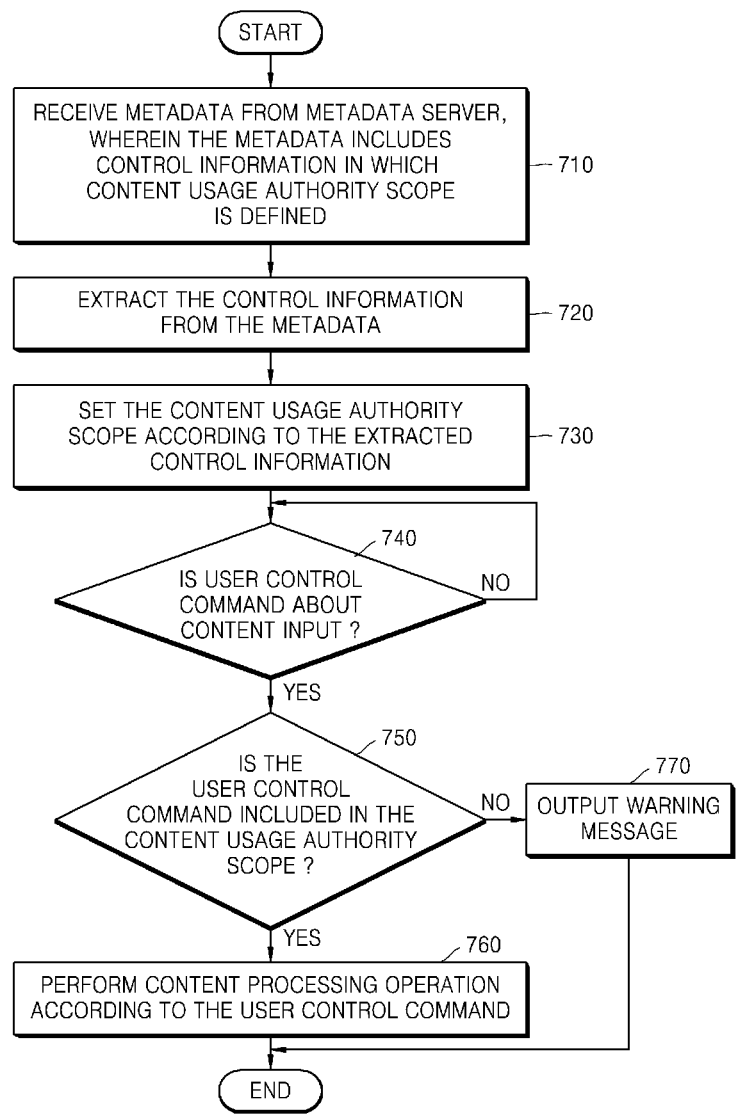
FIG. 7 is a flowchart of a method by which a client limits a content usage authority scope by using metadata, according to another exemplary embodiment of the present invention.

FIG. 7 is a flowchart of a method by which a client limits a content usage authority scope by using metadata, according to an exemplary embodiment of the present invention.

Referring to FIG. 7, in operation 710, the client receives metadata from a metadata server, wherein the metadata includes control information in which the content usage authority scope is defined.

In operation 720, the client extracts the control information from the received metadata.

In operation 730, the content usage authority scope of the client is set according to the extracted control information. For example, as shown in Table 1 above, a control information bit value, by which an allowed operation scope of content is described, may be extracted, and then, an allowed operation may be determined by performing a bit operation. Meanwhile, the client connects to an external server storing content, and receives desired content by using content location information that is included in the metadata.

In operation 740, the client determines whether a user control command about the received content is input. When it is determined in operation 740 that the user control command is input, in operation 750, the client determines whether the user control command about the content is included in the content usage authority scope. If the user control command is not included in the content usage authority scope, in operation 770, a warning message is output. Otherwise, if it is determined in operation 750 that the user control command is included in the content usage authority scope, in operation 760, a content processing operation is performed according to the user control command.

According to the present invention, it is possible to allow the user to use the content only within the content usage authority scope allowed by the service provider. By doing so, the present invention can prevent a wrongful content usage by the user disregarding intentions of the service provider or the content creator. Also, the present invention can make the user use the content according to the intentions of the service provider, thereby improving interest of the service provider and providing the service provider with an opportunity to provide various contents.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

The invention can also be embodied on a computer readable transmission medium. As an example of a computer readable transmission medium, the invention can be embodied on carrier waves (such as data transmission through the Internet).

While the present invention has been particularly shown and described with reference to exemplary embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of providing metadata of content via a predetermined network, the method comprising:
    generating the metadata in a metadata server, the metadata comprising a control information for limiting a content usage authority scope of a client which receives the content and a content location information;
    transmitting the metadata to the client; and
    transmitting the content to the client from a content storage unit in response to a request that is generated by referring to the content location information included in the metadata;

wherein the predetermined network is an IP (Internet protocol) network, and the content is provided to the client according to an IPTV (Internet protocol television) service;

wherein the control information is set in such a manner that the content usage authority scope is limited in a segment of the content that is less than the entire content, and wherein the control information includes a segment ID indicating the segment for which control operation of the client is limited and segment control information indicating the content usage authority scope for the segment corresponding to the segment ID.

2. The method of claim 1, wherein the control information comprises information about whether the client is able to perform at least an operation from among a reproduction start, a reproduction stop, a reproduction pause, a reproduction resume, a fast forward, a rewind, a skip, and a record, which are related to the content.

3. The method of claim 1, wherein the metadata is based on an XML (Extensible Markup Language) format defined in the specifications of the TVAF (TV-Anytime forum).

4. A non-transitory computer readable recording medium having recorded thereon a program causing a computer to execute the method of claim 1.

5. A method of limiting a content usage authority scope of a client using content that is provided via a predetermined network, the method comprising:

receiving metadata from a metadata server, wherein the metadata comprises a control information in which the content usage authority scope of the client is defined and a content location information;

requesting the content by referring to the content location information of the metadata to the content storage unit; and limiting an operation of the client using the content according to the content usage authority scope;

wherein the predetermined network is an IP network, and the content is provided to the client according to an IPTV service;

wherein the control information is set in such a manner that the content usage authority scope is limited in a segment of the content that is less than the entire content, and wherein the control information includes a segment ID indicating the segment for which control operation of the client is limited and segment control information indicating the content usage authority scope for the segment corresponding to the segment ID.

6. The method of claim 5, further comprising:
extracting control information from the metadata; and
setting the control usage authority scope of the client according to the extracted control information.

7. The method of claim 5, wherein the control information comprises information about whether the client is able to perform at least an operation from among a reproduction start, a reproduction stop, a reproduction pause, a reproduction resume, a fast forward, a rewind, a skip, and a record, which are related to the content.

8. The method of claim 5, wherein the limiting of the operation comprises:
receiving a control command about the content;
determining whether an operation about the content based on the control command is allowed to the client, according to the content usage authority scope; and
performing the operation about the content according to the control command if the operation about the content is allowed to the client.

9. A non-transitory computer readable recording medium having recorded thereon a program which causes a computer to execute the method of claim 5.

10. A server providing a client with information about content provided via a predetermined network, the server comprising:

a metadata generation unit which generates metadata, said metadata comprising a control information which limits a content usage authority scope of the client which receives the content and a content location information; and a metadata providing unit which transmits the metadata to the client;

wherein the predetermined network is an IP network, and the content is provided to the client according to an IPTV service;

the control information in such a manner that the content usage authority scope is limited in a segment of the content that is less than the entire content, wherein the control information includes a segment ID indicating the segment for which control operation of the client is limited and segment control information indicating the content usage authority scope for the segment corresponding to the segment ID; and wherein the control information is used by the client to request the content.

11. The server of claim 10, wherein the control information comprises information about whether the client is able to perform at least an operation from among a reproduction start, a reproduction stop, a reproduction pause, a reproduction resume, a fast forward, a rewind, a skip, and a record, which are related to the content.

12. The server of claim 10, wherein the metadata is based on an XML format defined in the specifications of the TVAF.

13. A client receiving content provided via a predetermined network, the client comprising:

a metadata scan unit which receives metadata from a metadata server, wherein the metadata comprises a control information in which a content usage authority scope is defined and a content location information;

a content receiving unit that requests content by referring to the content location information of the metadata to a content storage unit; and a control unit which limits a processing operation about the content, according to the content usage authority scope;

wherein the predetermined network is an IP network, and the content is provided to the client according to an IPTV service;

wherein the control information is set in such a manner that the content usage authority scope is limited in a segment of the content that is less than the entire content, and wherein the control information includes a segment ID indicating the segment for which control operation of the client is limited and segment control information indicating the content usage authority scope for the segment corresponding to the segment ID.

14. The client of claim 13, further comprising:
an authority setting unit which extracts the control information from the metadata and sets the content usage authority scope of the client according to the extracted control information; and
an input unit which receives a control command from a user, wherein the control command is about the content and the processing operation is based on the control command.

15. The client of claim 13, wherein the control information comprises information about whether the client is able to perform at least an operation from among a reproduction start, a reproduction stop, a reproduction pause, a reproduction resume, a fast forward, a rewind, a skip, and a record, which are related to the content.

16. The client of claim 13, wherein the control unit determines whether the processing operation is comprised in the content usage authority scope and performs the processing operation when the processing operation is comprised in the content usage authority scope.

17. A method of limiting a content usage authority scope of a client using content that is provided via an IP (Internet Protocol) network, the method comprising:
  receiving metadata from a metadata server, wherein the metadata comprises a control information, in which the content usage authority scope of the content is defined, and a content location information;
  requesting a content storage unit for transmission of the content by referring to the content location information included in the metadata;
  receiving the requested content from the content storage unit;
  extracting the control information from the metadata; and
  limiting an operation of the client according to control information;
  wherein the control information is set in such a manner that the content usage authority scope is limited in a segment of the content that is less than the entire content, and wherein the control information includes a segment ID indicating the segment for which control operation of the client is limited and segment control information indicating the content usage authority scope for the segment corresponding to the segment ID.

* * * * *